(12) United States Patent
Connolly et al.

(10) Patent No.: US 6,749,121 B2
(45) Date of Patent: Jun. 15, 2004

(54) ANTENNA ASSEMBLY

(75) Inventors: Sean Connolly, Stony Brook, NY (US);
Jay Paul White, Bohemia, NY (US);
Kevin Cordes, Coram, NY (US); Alex Breytman, Bellmore, NY (US); Ronald Nottingham, Richmond, VA (US); Jorg Schlieffers, Setauket, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 69 days.

(21) Appl. No.: 10/051,650

(22) Filed: Oct. 19, 2001

(65) Prior Publication Data

US 2003/0075606 A1 Apr. 24, 2003

(51) Int. Cl.⁷ .................................................. G06K 7/10
(52) U.S. Cl. .................... 235/472.01; 343/872; 343/702
(58) Field of Search ..................... 235/472.01, 472.02; 343/702, 787, 872

(56) References Cited

U.S. PATENT DOCUMENTS

| | | | | |
|---|---|---|---|---|
| 4,805,175 A | * | 2/1989 | Knowles ..................... 372/24 |
| 4,940,992 A | * | 7/1990 | Nguyen et al. ............. 343/803 |
| 5,162,640 A | * | 11/1992 | Ishikawa ................ 235/462.49 |
| 5,555,459 A | * | 9/1996 | Kraus et al. ................. 343/702 |
| 6,195,053 B1 | * | 2/2001 | Kodukula et al. .......... 343/702 |

* cited by examiner

*Primary Examiner*—Diane I. Lee
*Assistant Examiner*—Lisa M. Caputo
(74) *Attorney, Agent, or Firm*—Fay Kaplun & Marcin, LLP

(57) ABSTRACT

A device (e.g., a bar code scanner) includes a communication arrangement and a housing enclosing the communication arrangement. The housing may be composed of an electrically conductive material and has an opening formed therein. In addition, the device includes a cover mounted over the opening in the housing. The cover includes an electrically conductive contact member mounted thereto. The contact member contacts a portion of the housing adjacent to the opening and is electrically coupled to the communication arrangement so that a perimeter of the opening in the housing acts as a part of an antenna to receive and/or transmit signals for the communication arrangement.

19 Claims, 2 Drawing Sheets

ANTENNA ASSEMBLY

BACKGROUND INFORMATION

Devices including embedded transmitters/receivers, such as, e.g., personal digital assistants ("PDAs"), bar code scanners, cellular telephones, portable radios, televisions and terminals, etc., are often encased in metal or metal-plated housings presenting difficulties in the design of antennae for such devices due to interference introduced by the metal housing and other electronic components. As the size of such devices has decreased over time, the required minimum size of the antenna has significantly limited design options. For example, protruding antennae are undesirable because they are not in line with the profile requirements of a small device and the danger of the protruding antenna breaking. Slot antennae require openings the size of which tend to create mechanical weak points in the housing and, as they are often covered in plastic, they are susceptible to damage if, for example, the device is dropped or otherwise impacted or abraded.

SUMMARY OF THE INVENTION

The present invention relates to a device (e.g., a bar code scanner) which includes a communication arrangement and a housing enclosing the communication arrangement. The housing is composed of an electrically conductive material and has an opening formed therein. In addition, the device includes a cover mounted over the opening in the housing. The cover includes an electrically conductive contact member mounted thereto. The contact member contacts a portion of the housing adjacent to the opening and is electrically coupled to the communication arrangement so that a perimeter of the opening in the housing acts as a part of an antenna to receive and/or transmit signals for the communication arrangement.

DETAILED DESCRIPTION

Figure 1:
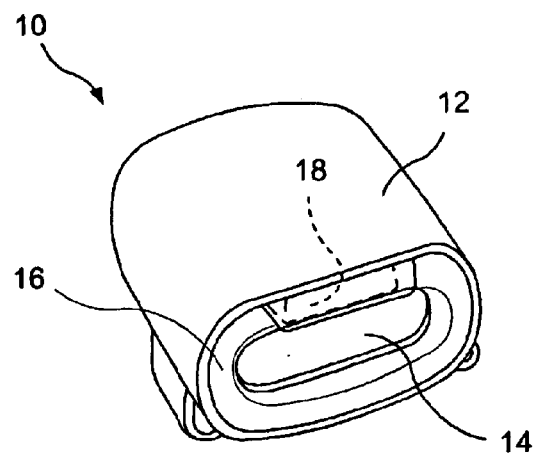
FIG. 1 shows a perspective view of a bar code scanner according to an exemplary embodiment of the present invention.

The present invention may be further understood with references to the following description of preferred exemplary embodiments and the related appended drawings, wherein like elements are provided with the same reference numerals. It should be understood that, although the preferred embodiment of the present invention will be described with reference to a bar code scanner, the present invention may be implemented on any device requiring an antenna such as a PDA, an embedded device, a radio, a telephone, a television, etc., and the term device will be used throughout this description to generically refer to all such devices.

As shown in FIGS. 1–4, a bar code scanner 10 may include a housing 12 which is composed of a an electrically conductive material such as a metal. The housing 12 includes an opening 14 through which a light may be received. For example, a bar code scanner may employ a scanning system which directs a laser light beam via a lens or other optical components through the opening 14 along a light path toward a target that includes a bar code symbol on a surface thereof. A sensor or photo-detector detects light reflected or scattered from the symbol back through the opening 14. This light may then be converted into an electrical signal that is decoded into a digital representation of the data represented by the scanned symbol. Those skilled in the art will understand that there are multiple devices that require at least one opening 14 in the housing 12. For example, a camera has an opening for a lens, a PDA and mobile terminals have an opening for a display screen, etc. Thus, in some cases, the opening 14 is used by the device to collect light (e.g., camera), in some cases to both transmit and collect light (e.g., bar code scanner) and in some cases to provide a display to a user (e.g., PDA). Those skilled in the art will understand that the antenna according to the present invention will work equally well regardless of the underlying functionality of the opening 14.

The housing 12 may also house the electrical and electronic components for the device (e.g., processors, power source, etc.) including a conventional communication device which is capable of receiving and sending signals. The scanner 10 may also include a cover 16 which may be adapted to cover the opening 14 to protect the electronic components of the scanner 10 and/or operate optically on the transmitted or received light (e.g., the cover may house the lens (or exit window) through which light is transmitted or received by the scanner 10). The cover 16 may also be referred to as a bezel.

Continuing with the example of the scanner 10, after the scanner 10 has received and processed the information from the barcode symbol, it may be desirable to transmit the information over the air to another device (e.g., a central computing system). This transmission of data is accomplished via the communication device within the housing 12. Those skilled in the art will understand that the communication device may also be responsible for receiving data transmissions from other devices and the antenna according to the present invention works equally well for both receiving and transmitting signals.

To facilitate this communication, an antenna unit 18 may be mounted in the cover 16 and adjacent to an edge of the opening 14, but does not touch the housing 12. If the antenna unit 18 were to come into physical contact with the conductive metal housing 12 of the scanner 10, it may create an interference pattern and disrupt the communication. Those of skill in the art will understand that the exact location of the antenna unit 18 in relation to the opening 14 does not matter because the antenna unit 18 may be tuned to for factors introduced by the exact location of the antenna unit 18 (e.g., proximity to the housing, proximity to the exit window, proximity to the surrounding components). However, once the antenna unit 18 is tuned based on the factors associated with its location, the location of the antenna unit 18 should generally remain static with respect to the opening 14 in order to avoid additional tuning. As will be described in greater detail below, the cover 16 and antenna unit 18 of the present invention allow the antenna unit 18 to remain static because it is contained within the cover 16.

The antenna unit 18 interacts with the opening 14 to receive and send signals. The opening 14 should be approximately ½ of a wavelength of the transmitted/received waves at the frequency of operation. For example, a device which communicates using the IEEE 802.11 communication protocol at 2.4 GHz (giga-hertz) requires an opening 14 of approximately 2.4 inches. Devices which need to communicate such information for various purposes (e.g., factory automation, inventory control, inter-company data transfer, etc), generally operate at very high unlicensed frequencies (e.g., 2.4 GHz). Thus, the small openings required in the devices for light transmission/reception or display are sufficient to operate in conjunction with an antenna unit for communication purposes over a range of the desired frequencies. This alleviates the need to form additional openings in the housing (which may cause mechanical weak points) used exclusively for communication purposes.

Those skilled in the art will understand that, based on the shape of the opening 14, the antenna unit 18 and the opening 14 may interact to operate for several frequencies or throughout a range of frequencies. That is, the antenna unit 18 in conjunction with the opening 14 will be effective for waves of any frequency wherein the distance across the opening 14 at a given point is approximately one-half of the wavelength at that frequency or greater. The antenna unit 18 may still operate at dimensions smaller and/or larger than ½ the wavelength but with different efficiencies and modes. For example, at a wavelength larger than ½ wavelength openings, a different mode may be utilized, resulting in different radiation patterns (e.g., more or different nulls).

Furthermore, in view of the present disclosure, those skilled in the art will understand that the antenna unit 18 and the opening 14 will act effectively as long as the opening 14 is substantially free of electrically conductive materials (i.e., the cover 16 substantially formed of nonconductive materials, such as magnesium). The cover 16 may, for example, be formed of glass, plastic or other non-conducting material which may be received within the opening 14. Air may also be received within the opening 14.

Figure 2:
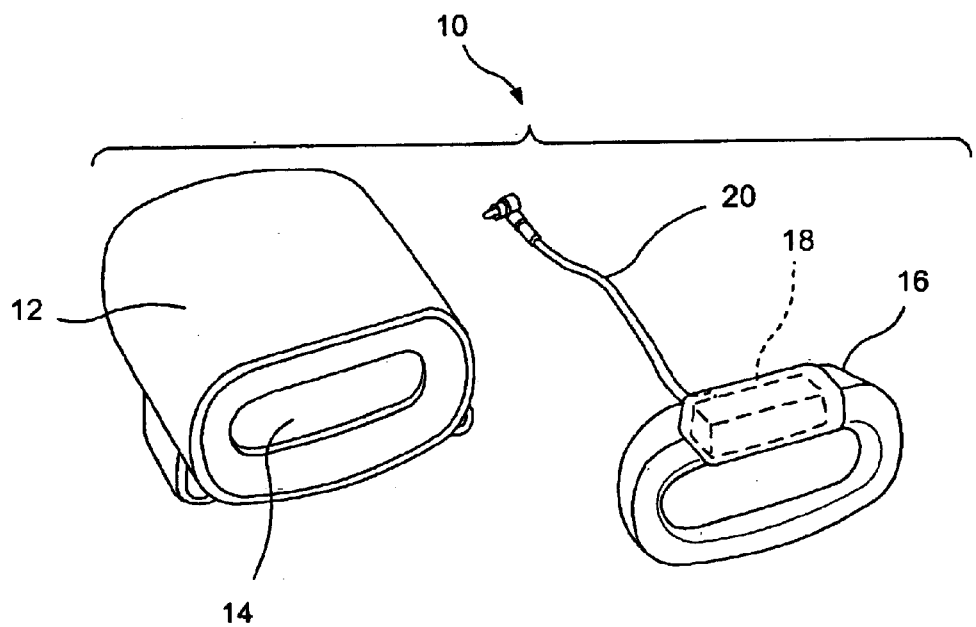
FIG. 2 shows a perspective view of a housing and a cover of the scanner illustrated in FIG. 1 which are separated from one another.
Figure 3:
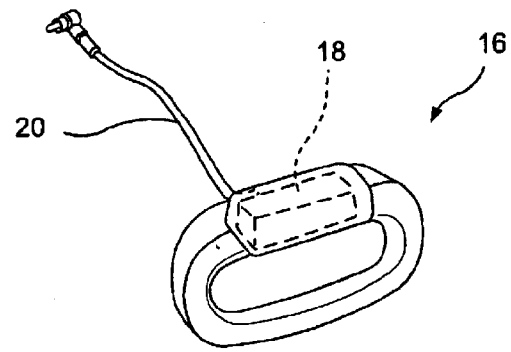
FIG. 3 shows a perspective view of the cover illustrated in FIG. 2.
Figure 4:
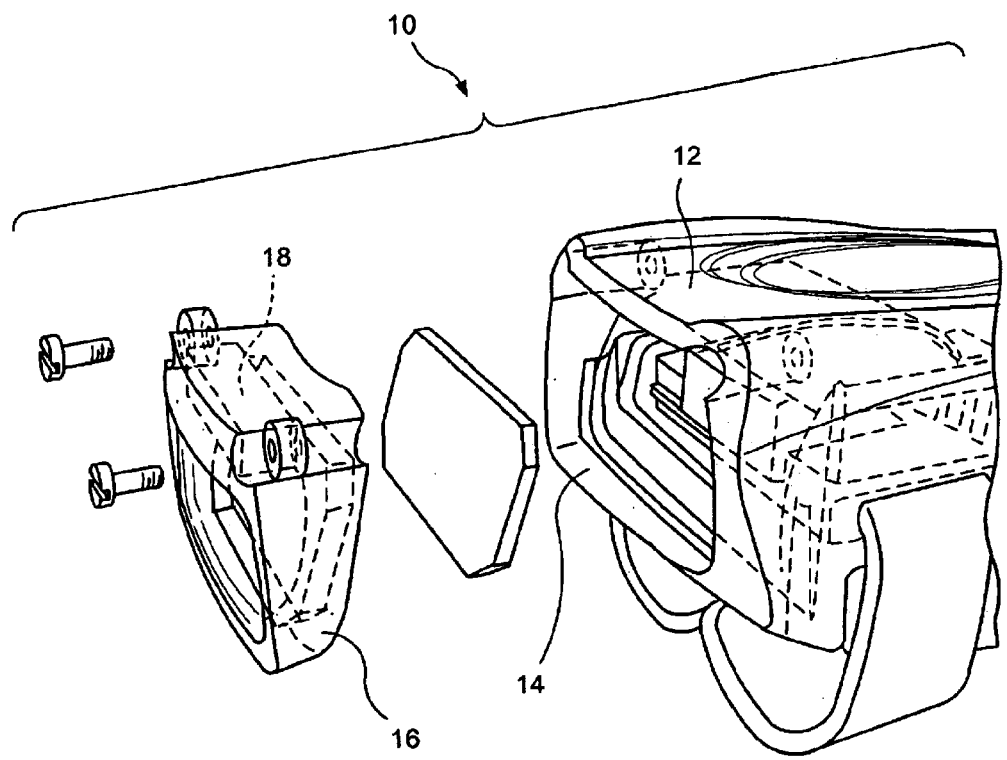
FIG. 4 shows a three-dimensional view of a bar code scanner according to an exemplary embodiment of the present invention.

Referring to FIGS. 2 and 3, the antenna unit 18 is coupled to the communication device via a wire 20 extending out of the cover 16 into the housing 12. The cover 16 in FIGS. 2 and 3 is made of a molded plastic and the antenna unit 18 is encased within the molded plastic. As described above, such an arrangement allows for the antenna unit to remain in a static position with respect to the opening 14 when the cover 16 is mounted to the housing 12. Methods for mounting a cover 16 to a housing are well known in the art. Those of skill in the art will understand that antenna unit 18 does not need to be encased within the cover 16, but there maybe other methods of securing the antenna unit 18 within the cover 16. For example, the cover 16 may include a mounting location or void where the antenna unit 18 may be placed during the manufacture of the scanner 10. Additionally, the cover 16 may have multiple portions such as an inner cover and an outer cover, wherein the antenna unit 18 may be inserted between the inner and outer covers. Furthermore, the cover 16 and housing 12 may be unitary. Those skilled in the art will also understand that the thickness and material of the cover 16 may be selected substantially as in previous designs to ensure resistance to damage from impact and abrasion, etc., without impacting the effectiveness of the antenna unit 18 and its interaction with the opening 14.

For devices other than bar code scanners, bezels may be employed to secure covers for other openings—for example, openings for displays of televisions, cellular phones and PDAs, etc., or for speakers of radios or other audio devices. The arrangement for such devices is the same as described above, i.e., the communication device supported within the housing 12 is coupled to the antenna unit 18 by the wire 20.

The communication device may communicate with a receiving base station. Such communication may also utilize a conventional wireless communication protocol (e.g., IEEE 802.11)

In the preceding specification, the present invention has been described with reference to specific exemplary embodiments thereof. It will, however, be evident that various modifications and changes may be made thereunto without departing from the broadest spirit and scope of the present invention as set forth in the claims that follow. The specification and drawings are accordingly to be regarded in an illustrative rather than restrictive sense.

What is claimed is:

1. A device comprising:
   a communication arrangement;
   a housing enclosing the communication arrangement, the housing having an opening formed therein;
   a cover mounted over the opening in the housing, the cover including a peripheral housing contacting portion which extends around the opening; and
   an antenna mounted within the housing contacting portion of the cover and spaced from the housing so that the antenna and the opening cooperate to handle signals for the communication arrangement.

2. The device according to claim 1, further comprising:
   a processing arrangement situated within the housing and coupled to the communication arrangement, the processing arrangement processing the signals.

3. The device according to claim 1, wherein the device is a bar code scanner and further comprising:
   a sensing element detecting bar codes through the opening in the housing and converting the bar codes into signals,
   wherein the sensing element provides the signals to the communication arrangement which transmits the signals to a communication base station.

4. The device according to claim 1, wherein the communication arrangement communicates with a communication base station which is capable of at least one receiving and sending signals from and/or to the device.

5. The device according to claim 4, wherein the communication arrangement and the communication base station utilize a wireless communication protocol to transmit the signals.

6. The device according to claim 1, further comprising:
   a wire coupling the antenna to the communication arrangement, the wire extending out of the cover into the housing.

7. The device according to claim 1, wherein the opening of the housing is a half of a wavelength of the signals at a frequency of operation, and wherein an edge of the opening operates with the antenna as a loop antenna at a desired frequency.

8. The device according to claim 1, wherein the opening of the housing is substantially free of an electrically conductive material.

9. The device according to claim 1, wherein the housing is composed of an electrically conductive material.

10. The device according to claim 1, wherein the cover is composed of a substantially non-electrically conductive material.

11. The device according to claim 1, wherein the cover is composed of at least one of a plastic material and a glass material.

12. The device according to claim 11, wherein the antenna is situated between an abutting surface of the cover and an edge of the housing.

13. The device according to claim 1, wherein the antenna is free from physical contact with the housing.

14. The device according to claim 1, wherein the antenna remains in a static position with respect to the opening when the cover is mounted on the housing.

15. The device according to claim 1, wherein the cover includes a mounting location, the antenna being situated in the mounting location during a manufacturing process.

16. The device according to claim 1, wherein the cover includes an inner cover and an outer cover, the antenna being inserted between the inner and outer covers.

17. The device according to claim 1, wherein the cover and the housing are unitary.

18. The device according to claim 1, wherein the cover extends around the entire perimeter of the opening.

19. A mobile scanner comprising:

a communication arrangement communicating with a communication base station using a wireless communication protocol;

a housing enclosing the communication arrangement, the housing having an opening formed therein;

a cover mounted over the opening in the housing and being composed of a substantially non-electrically conductive material, the cover including a peripheral housing contacting portion which extends around the opening;

an antenna (i) mounted within the housing contacting portion of the cover, (ii) spaced from the housing and (iii) free from physical contact with the housing so that the antenna and the opening cooperate to handle signals for the communication arrangement: and a processing arrangement situated within the housing and coupled to the communication arrangement, the processing arrangement processing the signals.

* * * * *